Nov. 23, 1943.    M. F. CAVINDER    2,334,808
CORN PLANTER
Filed Sept. 23, 1942    2 Sheets-Sheet 1
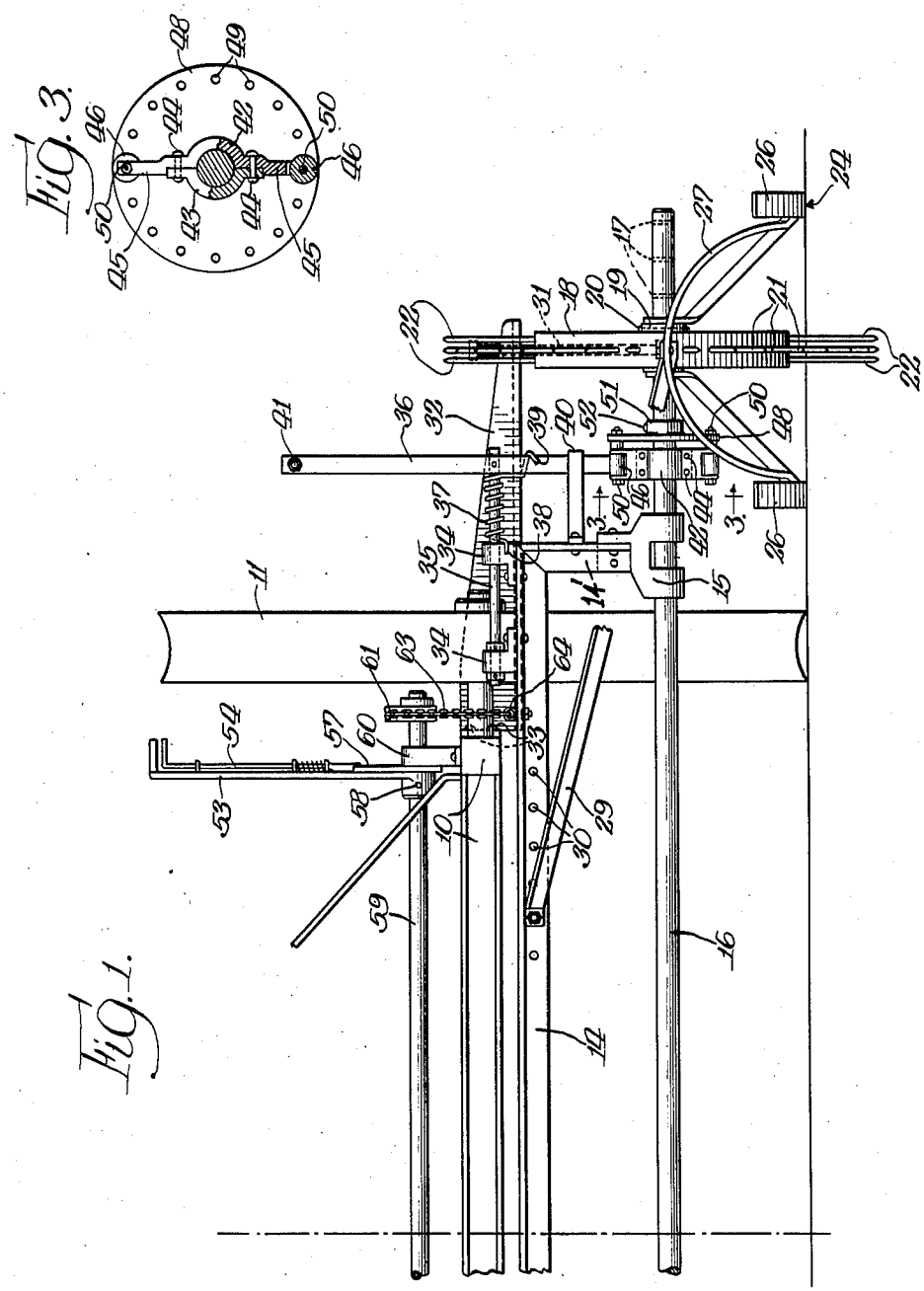
INVENTOR.
Milton F. Cavinder
BY
John P. Smith
Atty.

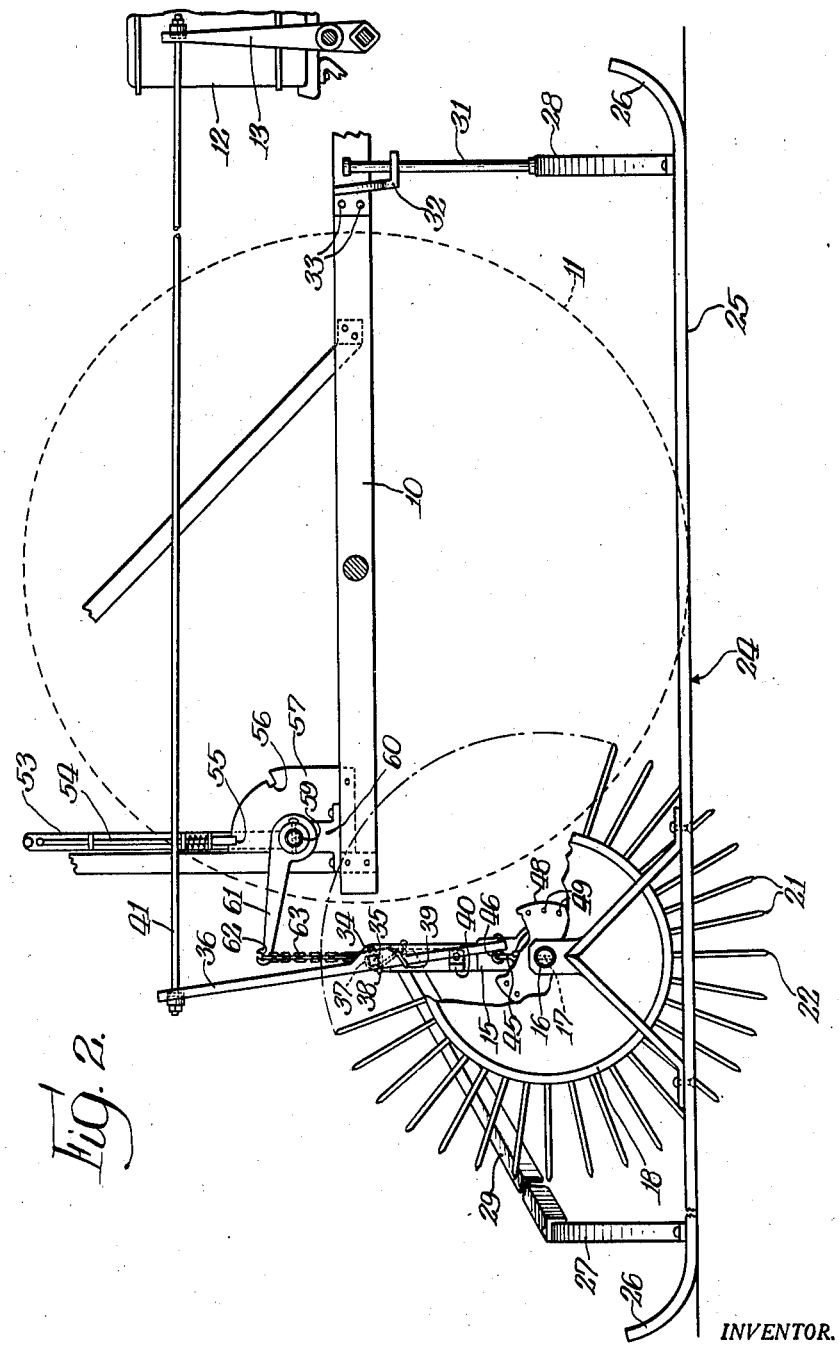

Patented Nov. 23, 1943

2,334,808

UNITED STATES PATENT OFFICE 2,334,808

CORN PLANTER

Milton F. Cavinder, New Buffalo, Mich., assignor of one-half to Edward G. Bicek, Chicago, Ill.

Application September 23, 1942, Serial No. 459,452

4 Claims. (Cl. 111—25)

The present invention relates generally to corn planters, but more particularly to a novel and improved attachment for tractor or horse drawn planters which permits the planting of corn in rows, and in transverse alignment without the necessity of employing a check wire together with its attendant difficulties and labor.

The present invention is an improvement on my co-pending application, Serial No. 418,342, filed November 8, 1941 on Corn planter.

The primary object of the present invention is to provide a novel and improved attachment for corn planter which will permit the planting of corn in transverse alignment regardless of the contour of the ground so that corn may be cross-cultivated during the cultivation period.

Another object of the invention is to provide a novel and improved construction of oppositely disposed marker wheels supported on skids or sleds. These skids or sleds are floatingly connected to the main frame of the planter so that the same will ride over the uneven contour of the ground and at the same time accurately space the hills in transverse alignment.

These and other objects are accomplished by providing a construction and an arrangement of the various parts in the manner hereinafter described and particularly pointed out in the appended claims.

Referring to the drawings:

Fig. 1 is a rear elevational view of a fragmentary portion of a conventional corn planter showing a portion of my improved planting attachment carried thereby;

Fig. 2 is a side elevational view of a fragmentary portion of the corn planter showing the relative position of my improved planting attachment supported thereon; and Fig. 3 is an enlarged detailed cross-sectional view taken on the lines 3—3 in Fig. 1.

For the purpose of illustration, I have shown my improved corn planting attachment in connection with a more or less conventional form of corn planter, a fragmentary portion of which is shown in Figs. 1 and 2 of the drawings. The corn planter in this instance comprises the usual main frame 10 which is supported in the conventional manner by the usual carrying wheels 11. The planter in this instance is provided with the usual seed cans 12 of which there is one located on each side of the machine. The seed can is also provided with a conventional seed feeding mechanism (not shown) which in turn, is controlled or tripped by the usual trip lever 13. For a more detailed description of the planter construction, see my co-pending application previously referred to.

My improved planter attachment comprises an inverted U-shaped frame member 14 supported at the rear of and from the main frame 10 of the planter. The frame member 14 has depending legs 14'. The opposite ends of the U-shaped frame member 14 are provided with bearing supports 15 in which is journaled a transverse shaft 16. The shaft 16 extends laterally beyond each of the supporting wheels 11 of the planter and is provided with spaced apart apertures as shown at 17. Adjustably secured to the outer ends of the shaft 16 are marker wheels 18. The marker wheels 18 are provided with hubs 19 through which a pin 20 is adapted to secure the marker wheels in the various positions indicated by the apertures 17 on the shaft for varying the distance transversely between the rows of corn planted. The marker wheels 18 are provided with radially projecting prongs or rods 21. Positioned at the diametrically opposite sides of the wheels 18, or at 180° intervals, are additional prongs as indicated at 22. These three prongs make distinguishing marks in the ground so that on the return trip of the planter, the marker wheel may be brought into alignment with the previously made marks for aligning or planting the corn in transverse rows.

In operation, the shaft 16 and its marker wheels 18 are supported on opposite skids or sleds generally indicated by the reference character 24. Each of these skids or sleds 24 comprise two laterally spaced apart longitudinally extending runners 25 which have their front and rear ends curved upwardly as shown at 26. These runners are held in spaced apart relation with respect to each other by front and rear arch members 27 and 28. Extending from each of the rear members 27 to the inverted U-shaped frame member 14 are diagonal braces 29. The inner ends of these diagonal braces 29 may be adjusted to various apertures 30 so as to accommodate the adjustment of the runners 24 when they are moved outwardly or inwardly for changing the distances between the rows of corn planted. The forward end of the runners 24 are floatingly supported with respect to the main frame 10 of the corn planter by rods 31 which have their lower ends connected to the forward arch members 26 and their upper ends slidably connected in apertures formed in the outer ends of each of the brackets 32. The inner ends of the brackets 32 are secured to the main frame member 10 as shown at 33. Mounted on one end of the frame member 14 are spaced apart bearings 34 in which are journaled a trip shaft 35. Secured to the outer end of the trip shaft 35 is a trip lever 36. Embracing the trip shaft 35 is a coil spring 37. One end of the spring 37 engages one of the bearings 34 as shown at 38 and the other end of the spring, as shown at 39, engages the lower end of the lever 36. The spring 37 normally actuates the lever in a clockwise direction as viewed from Fig. 2 of the drawings. A stop 40 secured to the frame member 14' extends laterally in the path of the lever and limits the movement to the position shown in Figs. 1 and 2 of the drawings. The upper end of the trip lever 36 is connected by means of a rod 41 to the upper end of the trip lever 13 of the seed feeding mechanism. Carried by and embracing the shaft 16 is a roller bracket 42 which is preferably supported in position on the shaft by a cap 43 through the medium of bolts or rivets 44. The bracket 42 has oppositely disposed arms 45 in the bifurcated portion of which are journaled rollers 46. Positioned adjacent the bracket 44 is a plate 48 which in turn is provided with a plurality of uniformly spaced apart oppositely arranged apertures 49. These apertures 49 are located adjacent the periphery of the disc 48 and are adapted to receive bolts 50 for adjusting and securing the roller trip 42 with respect to the disc 48. The disc 48 is provided with a hub 51 through the medium of which a bolt or pin 52 secures the disc 48 to the shaft 16. The planter attachment, which includes the frame 14 and its associated parts, is adjusted with respect to the planter frame proper 10 by means of a lever 53. The lever 53 is provided with the usual detent mechanism generally indicated by the reference character 54. This detent mechanism is adapted to engage notches 55 or 56 located in a sector 57 for supporting the attachment in operative position or in transporting position. The sector 57 is secured to the main frame 10 of the planter. The lever 53 is secured by means of a pin 58 to a transverse shaft 59. The shaft 59 is journaled in oppositely disposed bearings 60 carried by the main frame 10. Secured to the outer ends of the shaft 59 are rearwardly projecting cranks 61. The outer or free end of the cranks 61 are provided with hooks 62 to which the upper ends of lift chains 63 are connected. The lower ends of the chains 63 are connected to eye bolts 64, which in turn are connected adjacent the opposite ends of the frame member 14 of the planter attachment.

Summarizing the novel features of operation as well as the advantages of my invention, it will be seen by providing a planter attachment for corn planter consisting of a frame floatingly supported from the main frame of the planter on skids located on each side of and to the rear of the planter proper and having marker wheels thereon so that the prongs thereof project below the runners of the skids to effectively and accurately space off the distance between the tipping of the seeding mechanism, an accurate planting of the corn in transverse alignment is accomplished.

It will also be obvious that by manipulating the lever 53 forwardly and engaging the detent mechanism in the forward notch 56 of the sector 57, the attachment may be raised to transporting position. However, when the lever is returned to the position shown in Figs. 1 and 2 of the drawings, the planting attachment frame is then floatingly supported with respect to the main frame 10. As the corn planter moves forwardly, the prongs 21 of the marker wheels 18 located on each side of the planter proper, will engage the ground so as to accurately space the distance between the hills planted. Obviously, the three prongs or markers indicated by the reference character 22 and located 180° apart on the marker wheels, leave an identifying mark in the ground so that on the return travel of the planter, the marker wheels may be adjusted to register with the previously made marks. In this connection it will be also be noted that as the wheels 18 revolve, the shaft 16 in turn, revolves the disc 48 and thereby actuates the rollers 46 into engagement with the lower end of the trip lever 36 to discharge the seed corn from the seeding mechanism or hopper 12 in the manner previously described. If the operator desires to adjust or change the position of the trip with respect to the marker wheels either for correction or otherwise, the roller bracket 42 may be adjusted with respect to the disc 48 for accomplishing this purpose.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. The combination with a planter having a main frame and a seed planting mechanism mounted thereon, a supplemental frame floatingly supported by said main frame and having a transverse portion located rearwardly thereof, a transverse shaft journaled on said supplemental frame, marker wheels adjustably secured to said shaft, said supplemental frame including longitudinally extending skids located on the opposite sides of and outwardly with respect to said main frame, radially projecting prongs carried by said marker wheels and adapted to project below said skids for engagement with the ground, a lever carried by said supplemental frame and operatively connected to said seed planting mechanism, and a roller trip carried by said shaft and engageable with said lever for actuating said seed planting mechanism.

2. The combination with a planter having a main frame and a seed planting mechanism mounted thereon, a supplemental frame floatingly supported by said main frame, a transverse shaft journaled on said supplemental frame, marker wheels adjustably secured to said shaft, said supplemental frame including transverse frame member and two longitudinally extending skids, said skids located outwardly with respect to said main frame, radially projecting prongs carried by said marker wheels and adapted to project below said skids for engagement with the ground, a lever carried by said supplemental frame and operatively connected to said seed planting mechanism, and an adjustable roller trip secured to said shaft and adapted to rotate in the path of said lever for tripping said seed planting mechanism.

3. The combination with a planter having a main frame and a seed planting mechanism mounted thereon, a supplemental frame floatingly embracing the rear and sides of and supported by said main frame, a transverse shaft journaled on said supplemental frame, marker wheels adjustably secured to said shaft, said supplemental frame including two laterally spaced and longitudinally extending runners located on the opposite sides of said planter and outwardly of said main frame, a plurality of radially projecting prongs carried by said wheels and located to project certain of said prongs below said runners, a lever carried by said supplemental frame and operatively connected to said seed planting mechanism, and a roller trip carried by said shaft and engageable with said lever for tripping said seed planting mechanism.

4. The combination with a planter having a main frame and a seed planting mechanism mounted thereon, a marker attachment comprising a supplemental frame floatingly supported from said main frame and located outwardly with respect to said main frame, forwardly projecting runners carried by said supplemental frame, marker wheels mounted on said runners and adapted to engage the ground below said runners, and means for operatively connecting said marker wheels with said seed planting mechanism for controlling the deposit of said seed.

MILTON F. CAVINDER.